May 7, 1968  A. J. WENNERSTROM  3,381,897
LAMINATED NOZZLE THROAT CONSTRUCTION
Filed Nov. 2, 1966  3 Sheets-Sheet 1
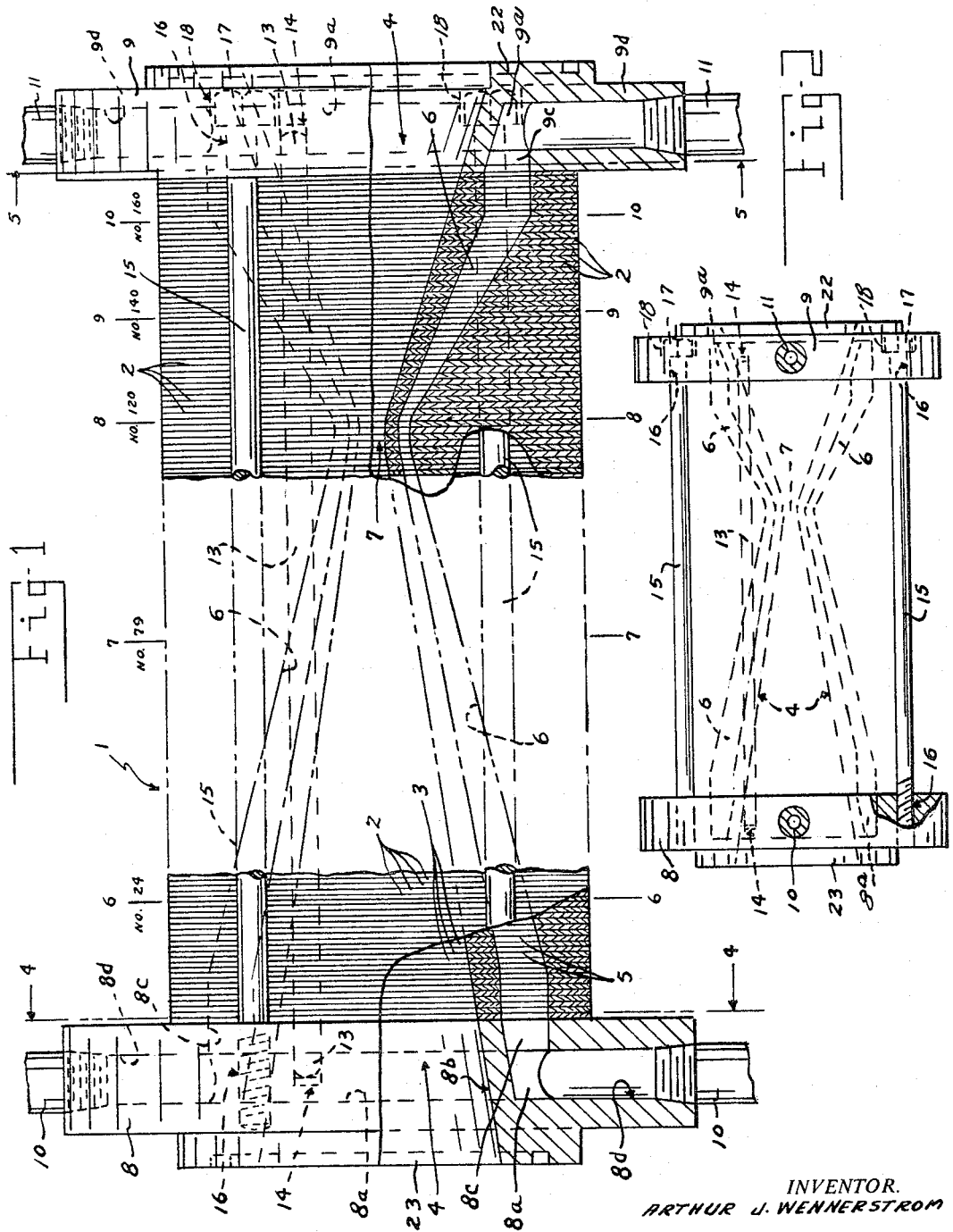
INVENTOR.
ARTHUR J. WENNERSTROM
BY Harry A. Herbert Jr
Charles H. Wagner
ATTORNEYS

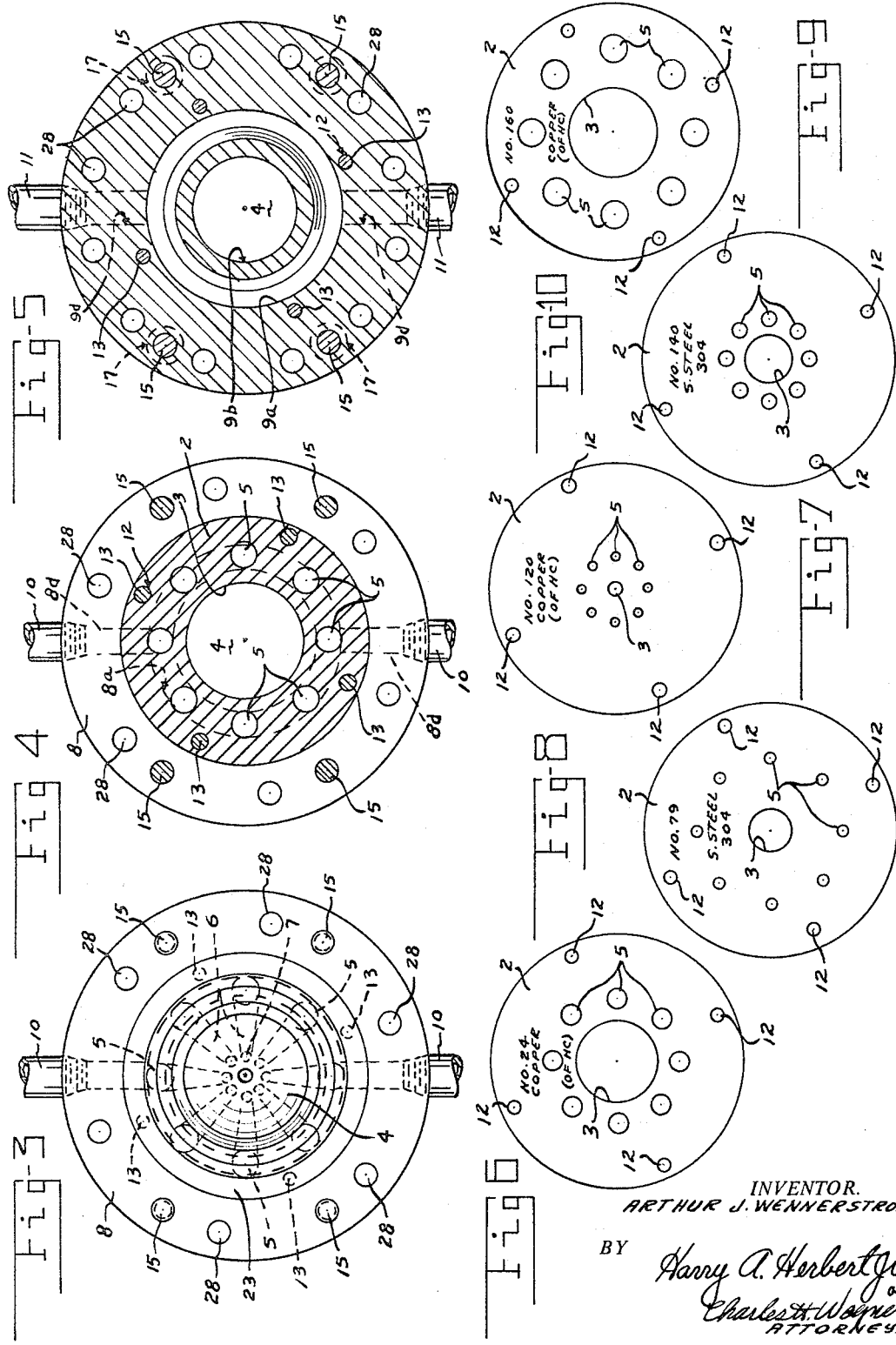

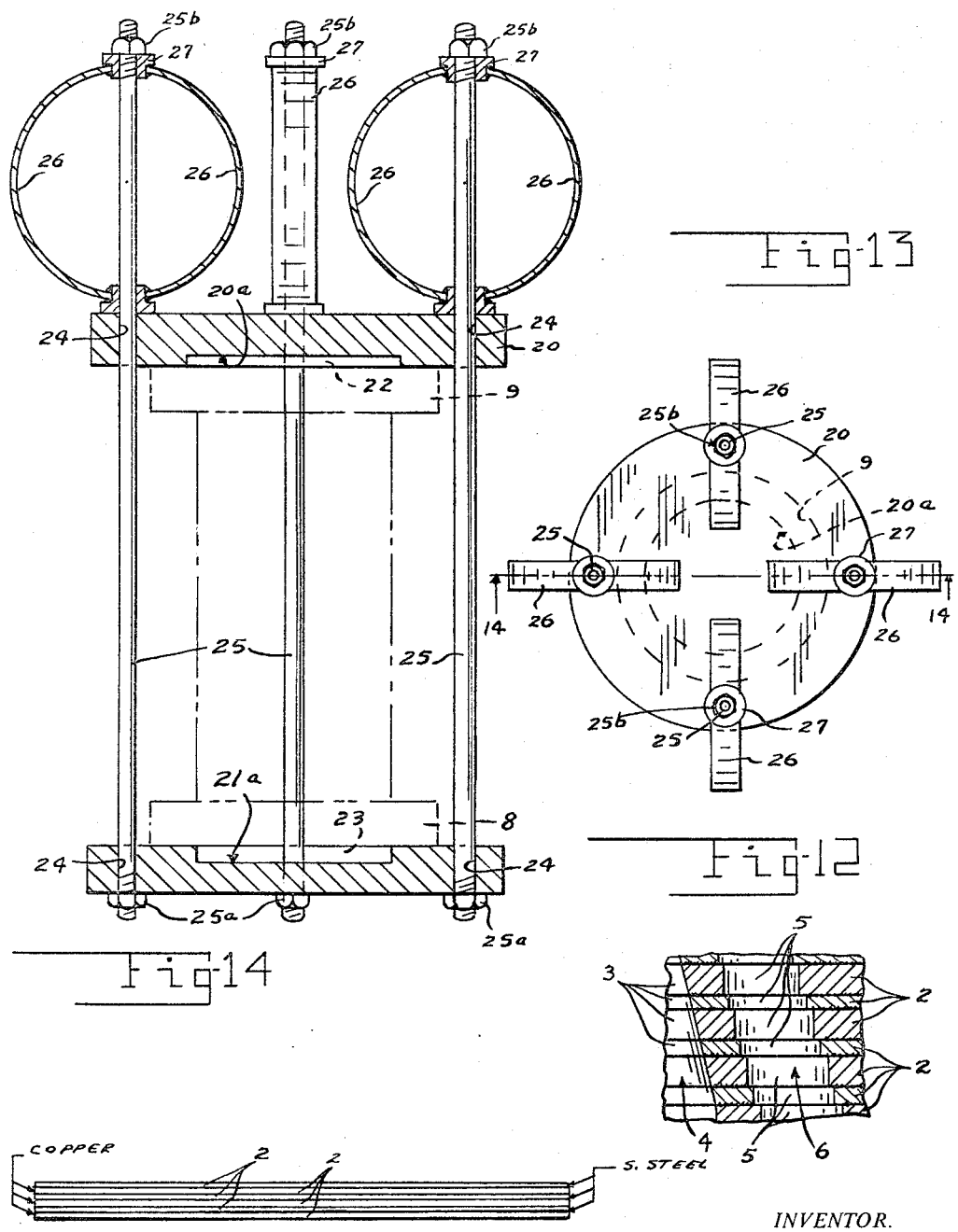

United States Patent Office  
3,381,897  
Patented May 7, 1968

3,381,897  
LAMINATED NOZZLE THROAT CONSTRUCTION  
Arthur J. Wennerstrom, Brookline, Mass., assignor to the United States of America as represented by the Secretary of the Air Force  
Filed Nov. 2, 1966, Ser. No. 591,573  
10 Claims. (Cl. 239—127.1)

The invention described herein may be manufactured and used by or for the United States Government for governmental purposes without the payment to me of any royalty thereon.

This invention relates to fluid pressure nozzle throats and the like, and more particularly to laminated nozzle throat constructions through which fluid passes at very high velocities, pressures and temperatures, having for an object a construction which provides appreciably increased strength at a small sacrifice of thermal conductivity.

A further object of the invention is the provision of a laminated nozzle throat construction which not only provides greatly increased strength with little or no sacrifice in thermal conductivity and adequate cooling, but provides a construction allowing the placing of coolant passages around the throat of arbitrary intricacy.

A further object of the invention is the provision of a nozzle throat structure comprising multiple discs or plates, each having a throat opening and coolant passages formed therein with the discs laminated together with the throat opening and coolant passages in aligned communicating relation.

A further object is the provision of a laminated nozzle throat structure composed of multitude of relatively thin discs secured together to form the throat nozzle, in which the discs are formed of stainless steel or the like to provide strength, and copper or the like to provide maximum thermal conductivity, and secured alternately together to form a stack of alternate stainless steel and copper discs.

A further object is the provision of a nozzle throat construction in which the steel discs of maximum strength and the copper thermal conductivity discs are relatively thin and brazed together under axial pressure to provide an integral laminated nozzle throat having great tensile strength with high thermal conductivity and including dowel means extending through all the discs for aligning the axes of the coolant openings and the throat openings therein during the brazing together thereof.

A further object is the provision of a laminated nozzle throat structure comprising alternate flat relatively thin steel and copper discs which may be simple and inexpensive to manufacture in quantity, having central throat nozzle passages of different diameter and coolant passages of different diameters and radial locations, whereby the coolant passages in the laminated throat may be individually shaped in any way most advantageous in cooling without appreciably increasing the manufacturing complexity to provide a nozzle throat structure in which the coolant passages, when the discs are assembled and brazed together, may provide an integral structure having coolant passages therein having predetermined shapes, sizes and tapers which may be impractical or impossible to make in an initially formed structure, and requires no final finishing or machining.

A further object is the provision of a laminated nozzle throat in which the thermal conductivity discs are formed of OFHC (oxygen free high conductivity) copper sheet material, having a thickness of about .064″ and the alternate steel discs are formed of No. 304 stainless steel sheet material having a thickness of about .038″ with the throat and surrounding coolant openings formed therein prior to assembly, and then brazed together using brazing foil layers therebetween of about 0.001″ thick foil of about 60 percent silver, 30 percent copper, and 10 percent zinc brazed in a hydrogen or argon oven at about 1550° to 1575° F. while applying yieldable axial spring or resilient pressure to the ends of the stack of the alternately superimposed steel and copper discs during the brazing thereof.

A further object is the provision of a nozzle throat structure composed of alternate thin sheet metal discs of OFHC copper and No. 304 stainless steel brazed together in which the thickness of the copper discs is about twice the thickness of the stainless steel disc layers or laminations.

Other objects and advantages of the invention will become apparent from the following description and accompanying drawings in which like reference characters refer to like parts in the several figures.

DRAWINGS

FIG. 1 is a somewhat schematic side elevation of a laminated nozzle throat construction, for instance the nozzle throat portion of a hypersonic wind tunnel, or other analogous structure constructed in accordance with the invention, parts being broken away and shown in section.

FIG. 2 is a somewhat diagrammatic elevation of the nozzle structure shown in FIG. 1 but at right angles thereto and on a smaller scale, in which the laminated discs are not individually shown, but showing the coolant passages at opposite sides and the central hypersonic throat schematically in dotted lines.

FIG. 3 is an end elevation of the nozzle unit shown in FIG. 1 looking toward the left end thereof.

FIG. 4 is a transverse sectional view taken about on line 4—4 in FIG. 1, looking in the direction of the arrows.

FIG. 5 is a transverse sectional view through the header end or plate on the right-hand end of the unit as shown in FIG. 1.

FIGS. 6, 7, 8, 9 and 10 are plan views of the various discs positioned in, or about in, the planes 6—6, 7—7, 8—8, 9—9, and 10—10 respectively in FIG. 1, to show the respective changes in the locations and sizes of the central throat openings and surrounding coolant openings in the discs in the planes indicated.

FIG. 11 is a side view showing a few of the copper and steel perforated discs in alternate stacked relation in which the steel discs are about half the thickness of the copper heat dissipating discs.

FIG. 12 is a greatly enlarged fragmentary sectional view through a few of the stacked alternate steel and copper discs showing the offset relation of the coolant passages therein, which also tend to produce turbulence and better cooling by the coolant flow therethrough, and also indicated the silver solder foil brazing layers between the surfaces of the discs.

FIG. 13 is a top plan view of the jig or apparatus used for holding the stacked discs and the end manifold members in position and providing clamping spring pressure on the ends thereof during the oven treatment brazing operation.

FIG. 14 is a longitudinal sectional view taken about on the plane indicated by line 14—14 in FIG. 13, looking in the direction of the arrows.

Reference is made to FIG. 1, illustrating a laminated nozzle throat structure denoted generally at 1 through which fluid may pass at very high pressure, velocity, and temperature, constructed in accordance with the invention and comprising a large number of individually machined relatively very thin discs 2.

The discs 2 have central openings 3 formed therein, varying in predetermined diameter to form, when assembled, as seen in FIGS. 1 and 12, a tapered or converging-diverging nozzle throat 4.

Surrounding the central or throat openings 3 in the discs 2 are a plurality of radially spaced smaller coolant circulating openings 5 varying in predetermined size, possibly shape, and radial distance from the center of the disc to form the coolant passages 6 when the discs are assembled.

As seen in FIGS. 1 and 2 the constricted throat section is indicated at 7. The passages 5 for the coolant are smallest and closest to the central throat 4 at this smaller throat section as seen also in FIG. 8.

As shown in FIGS. 1, 11 and 12, the nozzle throat structure is composed of a multitude of thin discs, for instance, as shown, about 180 in number, of which sample discs of the two metals employed and representing discs No. 1, 24, 79, 120, 140 and 160 are shown in FIGS. 4 and 6 to 10.

The discs 2 are preferably formed from two different sheet materials such as No. 304 stainless steel and OFHC copper (oxygen free high conductivity copper), also the thickness of the copper discs or plates is preferably about twice the thickness of the steel discs or plates to provide the desired thermal conductivity while the steel discs provide the adequate strength, thus providing a nozzle throat design which offers appreciable tensile strength at very small sacrifice in thermal conductivity. Furthermore, accurate placing of cooling passages of arbitrary intricacy therein is achieved by the laminated construction employing a very large number of individually machined thin discs 2 which are all brazed together into an integral unit as seen in FIG. 1. The interior discs laminations preferably utilize copper for the material for every other disc while the remainder of the discs and structure is stainless steel.

The structure as shown includes the solid header end plates or coolant distributing manifolds indicated at 8 and 9, preferably formed with annular passages 8a and 9a surrounding the central throat openings 8b and 9b which are shaped to conform to the tapered ends of the throat 4 at these points.

The annular coolant distributing passages 8a and 9a in the headers are provided with annularly spaced coolant openings 8c and 9c made therein to accurately register with the coolant openings 5 in the respective ends discs 2.

The clamping headers 8 and 9 are provided with suitable radial passages 8d and 9d to receive the coolant circulating conduits or pipes 10 and 11 through which a suitable coolant liquid is circulated to control the temperature of the nozzle during the operation thereof.

The plates 2 of the laminas are formed with dowel pin receiving holes or openings 12 through which dowel pins or shafts 13 are passed to align the various coolant passages or openings 5 and the central throat openings in the discs when they are stacked prior to brazing.

The dowel pins 13 fit the holes snugly and project beyond the opposite ends of the stack and project into sockets or holes 14 formed in the adjacent sides of the end or header members as shown in dotted lines in FIGS. 1 and 2. However, the ends of the dowel pins 13 are spaced from the bottoms of the receiving holes 14 to allow some slight axial movement of the plates as they are clamped and brazed together under axial spring pressure.

After the throat nozzle and end sections 8 are assembled and brazed together (or before), a plurality of clamping bolts or screws 15 which extend through annularly spaced holes 16 in the end plates 8 and 9 are threaded at one end into the one of the holes 16, for instance in the threaded holes in the plate 8, while the other ends or heads 17 of the clamping bolts are seated in sockets 18 in the outer face of the other end plate, for instance the plate 9.

The laminations or plates 2 are brazed together using about a 0.001 thick foil of about 60 percent silver, 30 percent copper, and 10 percent zinc between each joint.

Prior to assembly for brazing, the stainless steel must be degreased, and the copper and the silver foil must have a bright dip. Assembly is then accomplished under dust-free, oil- and grease-free circumstances after suitable flux has been applied to the steel lamination. The assembly is heated for 45 to 60 minutes in a hydrogen or argon oven at 1550° to 1575° F. as measured on an outside thermocouple. Shrinkage to be expected is approximately equal to half the total foil thickness.

Pressure must be maintained on the assembly throughout the entire heating and cooling cycle of the brazing.

This may be accomplished by the jig design shown in FIGS. 13 and 14, comprising end clamping plates 20 and 21 which are recessed as necessary at 20a and 21a to receive the annular fluid and pressure sealing flanges 22 and 23 on the coolant manifold plates 9 and 8.

The plates 20 and 21 are larger in diameter than the end plates 8 and 9 and are apertured at 24 to receive the clamping bolts 25 having tension adjusting tightening nuts 25a and 25b on their opposite ends.

Spring means are disposed on each of the bolts 25, substantially as shown in FIGS. 13 and 14, and disposed between the tightening nuts 25b and the top of the plate 24, the arcuate spring portions thereof being indicated at 26 and secured or welded at their ends to the washers or ferrules 27 which are apertured to slidably receive the bolts or bolt rods 25. The arcuate springs are preferably Inconel-X springs to provide the elasticity and spring tension required at the brazing temperature and accommodate expected shrinkage while maintaining the necessary pressure on the laminated stack of discs or plates 2.

The clamping rods 15 are removed from brazing after the assembly is clamped in the brazing fixture. They are replaced after brazing.

The particular embodiment shown is for installation in a 20-inch hypersonic wind tunnel, although the drawings are made on a much reduced scale.

It is crucial to this design that the thickness of the laminations is small with respect to all other dimensions and that the minimum distance between the central hot gas passage 4 and any coolant passage 6 is greater than the maximum thickness of any of the laminations 2 excluding the end pieces 8 and 9.

When these conditions are satisfied, the tensile strength and the thermal conductivity of the laminated material may be considered approximately equal to the average of the properties of the two constituents computed.

Tensile strength:

$$S_{composite} = \frac{S_1 t_1 + S_2 t_2}{t_1 + t_2} \tag{1}$$

Thermal conductivity:

$$k_{composite} = \frac{k_1 t_1 + k_2 t_2}{t_1 + t_2} \tag{2}$$

where the subscripts 1 and 2 refer to the individual properties of the two materials used, $t$ is the thickness of the individual laminations, S is the yield stress, and $k$ the corresponding thermal conductivity. The most suitable materials for this application were considered to be 304 stainless steel and OFHC copper. These two materials have nearly identical thermal expansion characteristics and can readily be silver brazed together in either a hydrogen or argon atmosphere in an oven.

Since the strain caused by a load must be equal for both the copper and the stainless steel laminations when they are bonded together, the maximum stress which will never exceed the elastic limit of the copper laminations is $$S_{yield} = \frac{S_{cu}\left[\left(\frac{E_{Fe}}{E_{cu}}\right)t_{Fe} + t_{cu}\right]}{t_{Fe} + t_{cu}} \tag{3}$$

where $S_{cu}$ is the elastic limit of copper and E represents Young's modulus for copper (cu) or stainless steel (Fe) as indicated. Copper is a very ductile material, however, and can be prestressed beyond its elastic limit to the point where the stainless steel reaches its elastic limit. When the applied load is removed, a small permanent set will remain as well as a residual stress within both the copper and the steel laminations. The maximum average stress which may be applied thereafter will be as given by Equation 1 where the $S_1$ and $S_2$ are the yield points of both materials and not a reduced value as given by Equation 3. Assume that the maximum stress initially applied is tension and corresponds to Equation 1. When the load is removed, a tensile stress will remain in the stainless steel and a compressive stress will exist in the copper. The performance up to the yield point predicted by Equation 1 will be completely elastic thereafter.

The detail design shown used 0.038 inch 304 stainless laminations and 0.064 inch copper laminations. The design objective was a copper lamination 1.5 to 2.0 times the thickness of the steel. The exact size was determined by commercially available sheet stock. The predicted characteristics of the nozzle constructed are:

No preload, Equation 3

$$S_{max} = \frac{32,000\left[\left(\frac{29}{17}\right)(0.038) + 0.064\right]}{0.038 + 0.064}$$

$$= 40,500 \text{ p.s.i.}$$

With preload, Equation 1

$$S_{max} = \frac{(32,000)(0.064) + (95,000)(0.038)}{0.064 + 0.038}$$

$$= 55,300 \text{ p.s.i.}$$

Thermal conductivity, Equation 2

$$k = \frac{(2,500)(0.064) + (105)(0.038)}{0.064 + 0.038}$$

$$= 1508 \text{ B.t.u./ft.}^2/\text{hr./in./}° \text{F.}$$

The laminated material thus has a yield stress without preload 25.5 percent greater than pure copper, a yield stress with preload 72.8 percent greater than copper, and a thermal conductivity which is 64.4 percent of the value for copper. The combined mechanical and thermal properties of the laminate are better for the intended purpose than any single element or alloy which the inventor is aware of.

The end pieces 8 and 9 are provided with suitably spaced bolt holes 28 for receiving bolts to secure the nozzle throat in place in the apparatus in which it is used, for instance a continuously running hypersonic wind tunnel employing air at a total pressure of above 3000 p.s.i., at total temperature above 3000° F. The invention therefore provides a means to extend the useful pressure and temperature operating range of a hypersonic wind tunnel throat section considerably above the limits possible in the previously known throat sections.

For purposes of exemplification a particular embodiment of the invention has been shown and described to the best understanding thereof. However it will be apparent that slight changes and modifications in the arrangement and construction of the parts thereof may be resorted to without departing from the true spirit and scope of the invention and contemplated in the accompanying claims.

I claim:

1. A high fluid pressure and high temperature laminated throat nozzle construction having a constricted axial throat passage and a plurality of annularly spaced surrounding coolant circulating passages disposed in predetermined spaced relation around said axial throat passage comprising, a multitude of individually formed discs of at least two different metallic sheet materials, each disc having a central throat opening and surrounding coolant passage openings formed therein, stacked together in alternate superimposed relation and brazed together as a unit with the central throat passage openings in aligned relation and the coolant openings therein in aligned relation.

2. A throat nozzle structure as defined in claim 1 in which said alternately superimposed and brazed together discs comprise alternately a metal having high thermal conductivity and a metal having a materially greater tensile strength.

3. A nozzle as claimed in claim 2 in which the discs of high thermal conductivity are at least twice the thickness of the alternate discs of greater tensile strength.

4. A nozzle as claimed in claim 3 in which the alternately stacked discs are composed of oxygen free high conductivity copper and No. 304 stainless steel.

5. A structure as claimed in claim 4 in which the copper discs have a thickness of about .064" and the steel discs have a thickness of about 0.038" and are silver brazed together as a single unit.

6. Apparatus as set forth in claim 5 in which the structure includes end coolant distributing manifold members each having a central throat opening and annular coolant circulating chamber therein formed with spaced coolant circulating openings disposed in register with the coolant passages in the stack, and silver brazed to the ends of the sack of discs to form an integral throat nozzle unit.

7. A throat nozzle as set forth in claim 6 including alignment dowel pin openings formed in each of said metallic discs, dowel pin sockets formed in the manifold members facing the ends of stack, and elongated dowel pins extending through said dowel pin openings into said sockets for retaining said plates and manifold members in position with the respective opening therein in predetermined alignment during brazing and thereafter.

8. A throat nozzle as set forth in claim 7 including elongated tie bolt members connected between the end manifold members outside of said stack for tying and clamping the end manifold members together with alternately stacked said discs therebetween.

9. A throat nozzle as set forth in claim 8 in which said discs are brazed together in a hydrogen or the like brazing oven at between 1550° F. to 1575° F. for 45 to 60 minutes, with a 0.011 inch thick brazing foil of 60 percent silver, 30 percent copper, and 10 percent zinc between each joint, while applying predetermined yieldable compressive axial pressure against the stack on the opposite ends of the end manifold members.

10. A laminated nozzle throat structure comprising a plurality of thin metallic flat discs of No. 304 stainless steel and OFHC copper, each having a central throat opening and a plurality of coolant circulating openings therein surrounding the central opening, and alternately stacked and brazed together to form an integral unit in which the openings vary in size and position to form a convergent-divergent throat passage and surrounding convergent-divergent coolant circulation passages between the ends of the stack, and the coolant passages surrounding the central throat passage converge toward each other and the central throat passage intermediate the ends of the stack at the point of maximum convergence of the central throat passage and then diverge away from each other and the central throat passage.

References Cited

UNITED STATES PATENTS

| | | | |
|---|---|---|---|
| 3,115,746 | 12/1963 | Hsia | 239—265.15 |
| 3,137,998 | 6/1964 | Beam | 239—127.3 |
| 3,153,320 | 10/1964 | Prosser | 239—127.3 |
| 3,157,026 | 11/1964 | Lampert | 239—127.1 |
| 3,282,421 | 11/1966 | Prosser et al. | 239—127.3 |
| 3,313,488 | 4/1967 | Lovingham | 239—127.1 |

EVERETT W. KIRBY, *Primary Examiner.*